United States Patent
Rosca

(10) Patent No.: US 8,332,318 B2
(45) Date of Patent: Dec. 11, 2012

(54) METHOD AND SYSTEM FOR THE ANONYMOUS EXCHANGE AND VERIFICATION OF ELECTRONIC FILES IN ESCROW OVER A COMPUTER NETWORK

(76) Inventor: Andrew Rosca, Stamford, CT (US)

( * ) Notice: Subject to any disclaimer, the term of this patent is extended or adjusted under 35 U.S.C. 154(b) by 71 days.

(21) Appl. No.: 12/182,256

(22) Filed: Jul. 30, 2008

(65) Prior Publication Data
US 2009/0037327 A1 Feb. 5, 2009

Related U.S. Application Data

(60) Provisional application No. 60/952,851, filed on Jul. 30, 2007.

(51) Int. Cl.
*G06Q 40/00* (2012.01)
(52) U.S. Cl. .......................... 705/40; 705/44
(58) Field of Classification Search ............... 705/35–45
See application file for complete search history.

(56) References Cited

U.S. PATENT DOCUMENTS

| | | | | |
|---|---|---|---|---|
| 6,599,324 | B2 * | 7/2003 | Saito et al. | 715/234 |
| 7,340,533 | B2 * | 3/2008 | Murtza et al. | 709/242 |
| 2006/0085314 | A1 * | 4/2006 | Grim et al. | 705/35 |
| 2007/0255625 | A1 * | 11/2007 | Katzen | 705/26 |

* cited by examiner

*Primary Examiner* — Charles Kyle
*Assistant Examiner* — Jennifer Liu

(57) ABSTRACT

A method and system for exchanging electronic files, such as digital images, digital documents, and/or digital audio files, via an escrow transaction. The method allows two transaction partners to store electronic files on a third party system and then grant each partner access to the files of the other partner only after both partners agree. The two partners can review partial information about the electronic files that is sufficient to determine if the files contain the expected data, but insufficient to derive meaningful information about said data. Instead of electronic files, it is also possible for one of the partners to provide payment in various forms in exchange for the electronic documents provided by the other partner.

5 Claims, 4 Drawing Sheets

METHOD AND SYSTEM FOR THE ANONYMOUS EXCHANGE AND VERIFICATION OF ELECTRONIC FILES IN ESCROW OVER A COMPUTER NETWORK

RELATED APPLICATIONS

This application claims the benefit of U.S. Provisional Application No. 60/952,851, filed Jul. 30, 2007.

FIELD OF THE INVENTION

The invention relates to computer data security. More particularly, the invention relates to a method and system exchanging electronic files via an anonymous escrow transaction.

BACKGROUND OF THE INVENTION

The Internet allows for the easy exchange of electronic files. Sometimes, however, it is necessary for two parties engaged in exchanging files to verify that the files they are about to receive contain the information they desire. This situation is usually resolved by the use of an escrow agent. An escrow agent is a neutral third party that is trusted by both parties. The escrow agent receives the electronic file from the sending party and only transfers it to the receiving party once payment has been received by the sending party. However, this type of escrow arrangement is only successful if the agent is able to verify the authenticity of the electronic file.

Consider the following example: Party A wants to buy an MP3 file from Party B. If Party A pays Party B up front, Party A has no guarantee that Party B will send the MP3 file. If, on the other hand, Party B sends Party A the file before receiving payment, Party A has no incentive to pay, because he already has the MP3 file.

In the MP3 example, say Party A is buying "Yellow Submarine" by the Beatles. Unless the escrow agent can confirm that the song they received is indeed "Yellow Submarine", the escrow transaction is useless. In most cases, such a verification of the transferred file is hard to do automatically, especially if its content is only relevant to the two transacting parties. In other words, sometimes the escrow agent cannot verify that the receiving party is getting what they are supposed to get.

The solution to this problem is to let the receiving party verify the asset. In the MP3 example, if the receiving party could listen to the MP3 file, they could confirm that it is what they wanted. As mentioned above though, if the receiving party got the entire file up front, they would have no incentive to pay.

The solution would be for the escrow agent to send the receiving party random portions of the MP3 file that they can listen to, e.g. most of the file is static, but random portions of it are left unaltered so you can hear the original. It is important that the various original portions of the song are in random places, so that the sending party can't simply send a file that contains mostly static to begin with. These random parts are chosen only once in the beginning of the transaction, because if they were to be re-selected randomly on separate occasions it may be possible for the receiving party to reconstitute the entire file simply by accessing it repeatedly, and thus obtaining a new small portion of it every time.

In another example, when two parties to a transaction sign a contract they may both want to have confirmation that the contract was also signed by the other party. The proposed method and system allows the parties to the transaction to upload an electronic version of the signed contract to a centralized server where neither party has access to the other party's file. However, both parties may review partial information about the file which is sufficient to confirm that the contract was indeed signed by the other party. Once both parties agree that the electronic document is as expected, the server releases the files to both parties.

In a different example, two individual members of an online dating site may want to exchange photos, but both parties are uncomfortable sending a photo to the other party before being certain they will receive the other party's photo. The system of the present invention allows both parties to upload their respective photos to a centralized, independent server, where they can both review small random portions of the photo to confirm that it is indeed a clear photograph of a person. Once both parties are satisfied and indicate so to the system, each can view the complete version of the other party's photo.

SUMMARY OF THE INVENTION

The method and system of the present invention allows escrow transactions involving the exchange of electronic files to occur anonymously and provides the receiving parties involved in the transaction with a way to verify that the files contain the desired information without actually obtaining the files. Neither partner needs to identify itself to the system or to the other partner. In addition, the method and system provides certain optional safeguards that make it extremely difficult or impossible for either of the partners to obtain a copy of the electronic files or documents. Instead, both parties can review said documents as they are stored on the server, for example, through a website, but they cannot download the documents.

The method and system is utilized to exchange electronic files in escrow via a computer network such as the Internet. It is also possible for one of the transaction partners to provide, in exchange for the electronic files provided by the second partners, payment or other compensation electronically.

DETAILED DESCRIPTION

Figure 1:
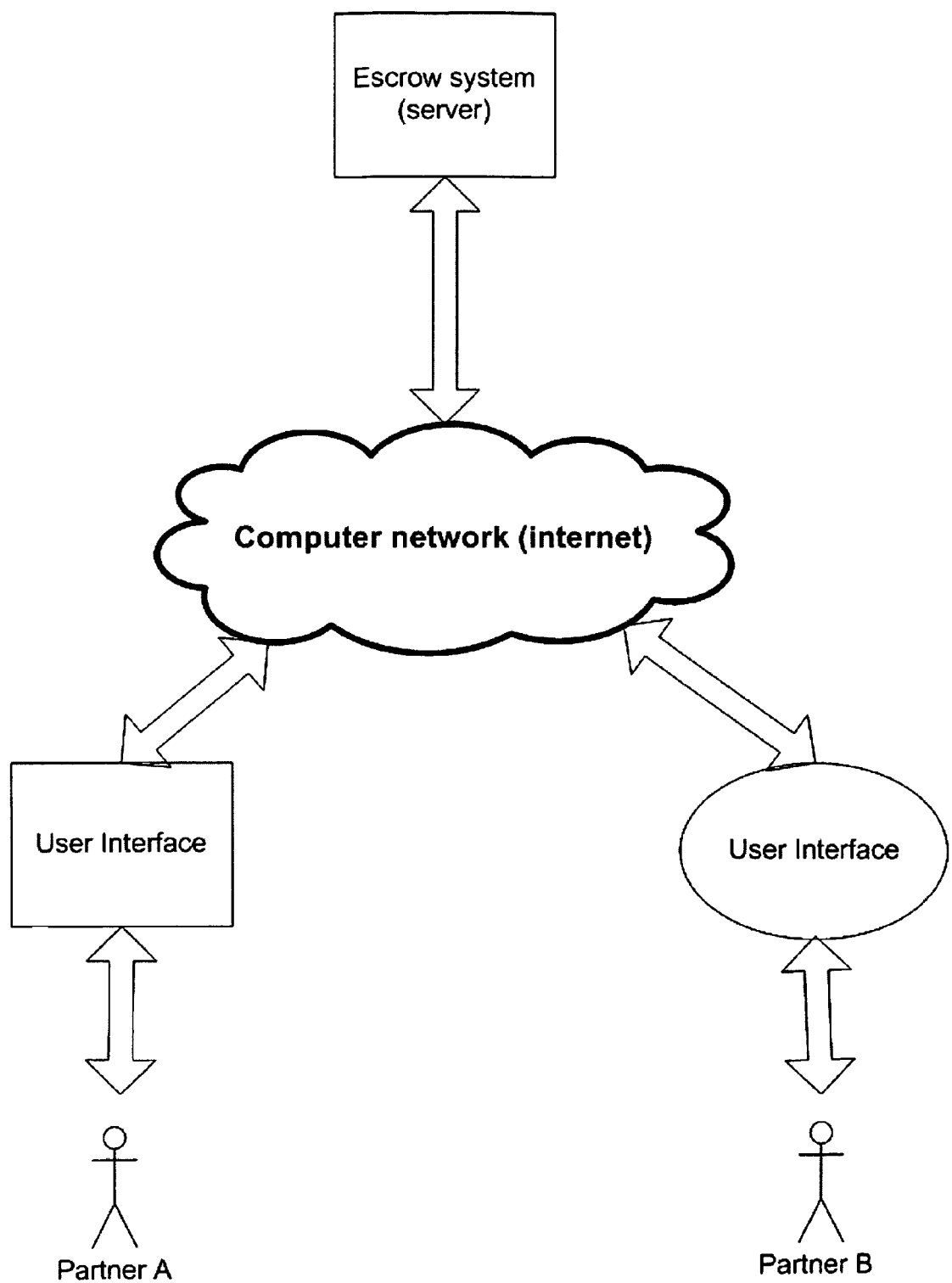
FIG. 1 is an overview of the system of the present invention.

As shown in FIG. 1, the system consists of a central server and associated, custom developed verification software, a computer network, such as the Internet, that the parties use to connect to the server, and user interfaces used by the parties to upload, preview, and retrieve electronic files or payments. The interfaces may be identical or different and may be represented by a website accessed via a web browser or a stand-alone computer application that can connect to the same network as the server. The verification software alters random portions of the electronic file so that a party is able to preview enough of the file to verify its authenticity.

Figure 2:
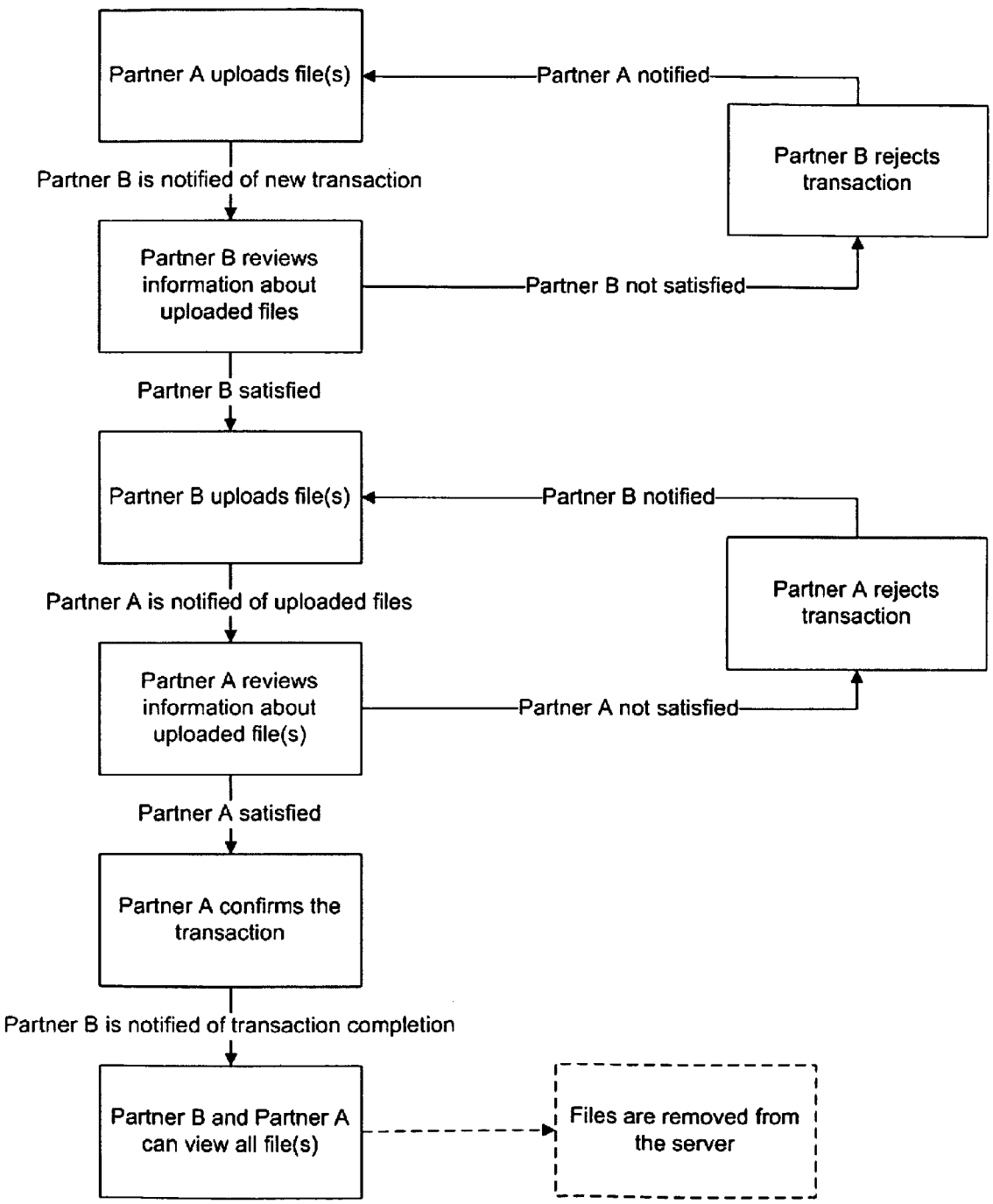
FIG. 2 is a flow chart of the method of one embodiment of the present invention.

In one embodiment, shown in FIG. 2, the first party uploads one or more electronic files to a centralized server. The second party can view partial information about the file(s) that confirms it contains the desired information without actually revealing that information. The second party then uploads their own file(s) thus indicating that they accept the escrow transaction and that the information contained in the first party's file(s) is acceptable. The first party now reviews the partial information about the files(s) provided by the second party. If the first party is satisfied as well and indicates so to the system, both parties may view the complete files(s) of either party. The files may then be removed from the server. If either party is not satisfied, they may reject the transaction and the other party is notified of the rejection.

Figure 3:
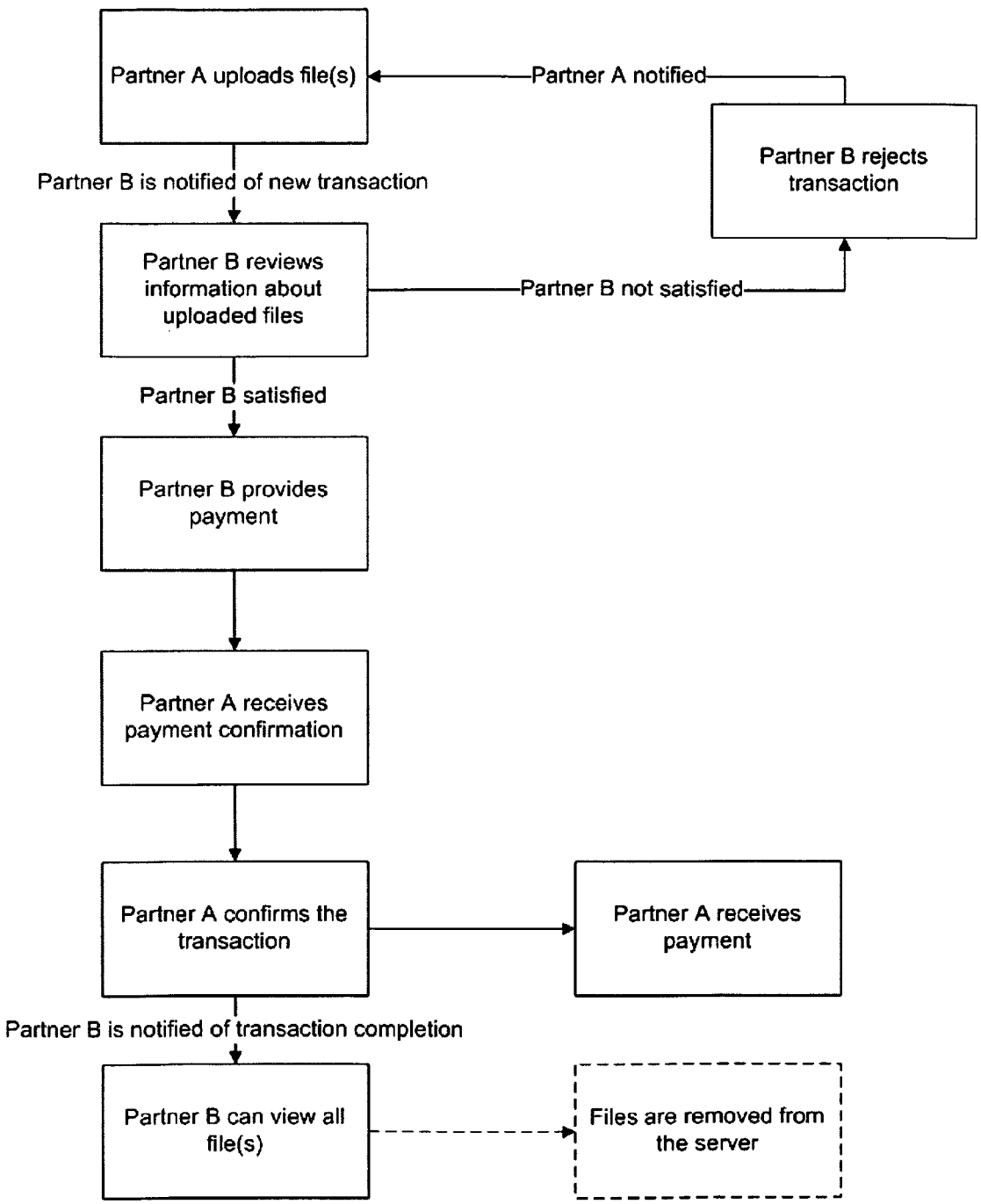
FIG. 3 is a flow chart of the method of another embodiment of the present invention.

In another embodiment, shown in FIG. 3, one party initiates the transaction by uploading a set of file(s) and specifying a desired monetary amount or other compensation method desired in exchange for the files(s). The second party then reviews partial information about the file(s) and provides payment or other compensation to the system. Once the system confirms that payment or compensation has been received, the files(s) become available to the second party and the payment or compensation is transferred to the first party. The files may then be removed from the server. If the party providing compensation is not satisfied, they may reject the transaction and the other party is notified of the rejection.

Figure 4:
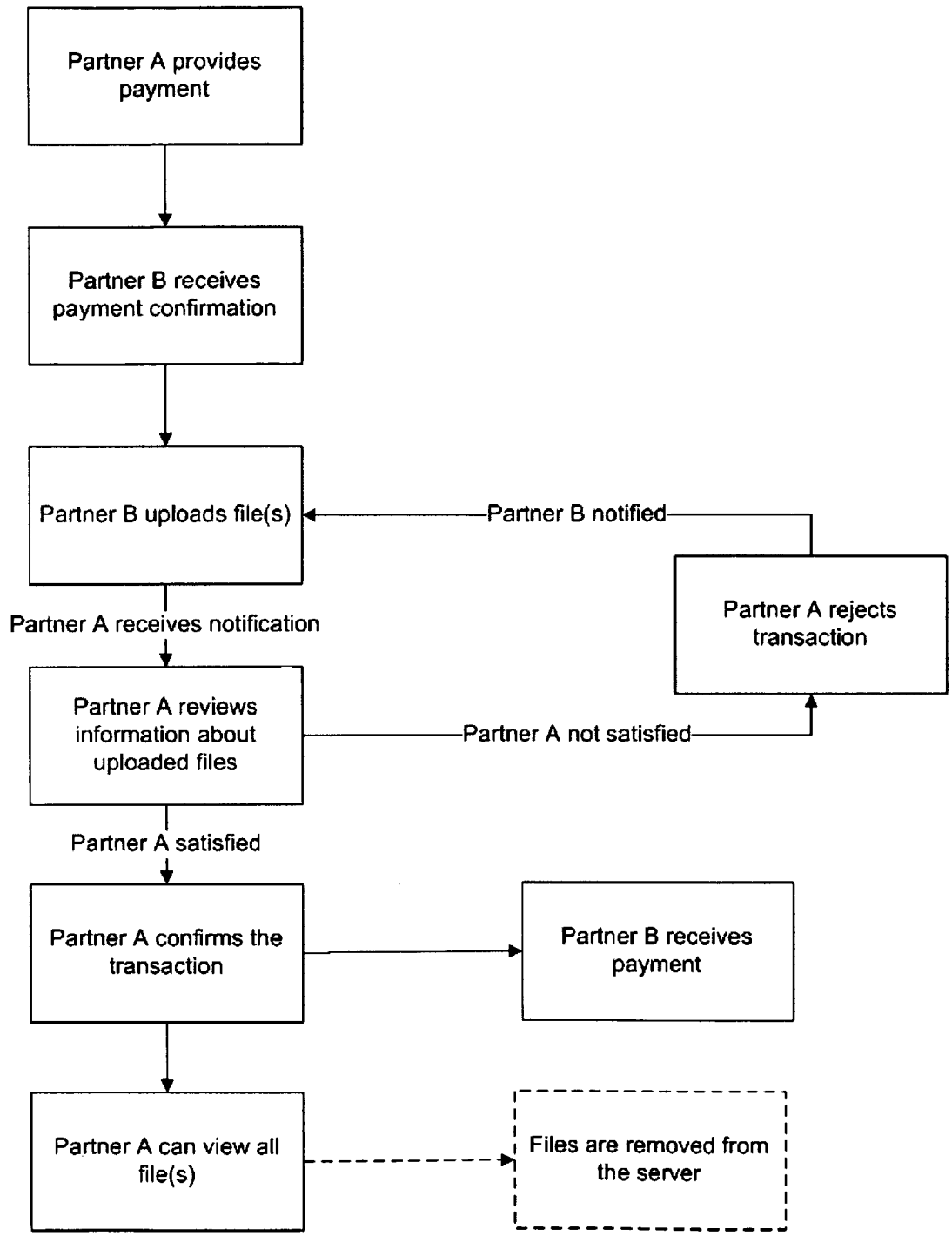
FIG. 4 is a flow chart of the method of a further embodiment of the present invention.

In a further embodiment, shown in FIG. 4, the transaction is initiated by the first party providing payment or compensation first. Once the system confirms receipt of the payment, the second party uploads the electronic files(s), which the first party may review. If the first party is satisfied, payment is transferred to the second party and the first party receives the electronic files(s). The files may then be removed from the server. If the party providing compensation is not satisfied, they may reject the transaction and the other party is notified of the rejection.

Throughout the escrow process described above, neither party has to identify itself to the system, nor to the other party. Thus, the escrow transaction may be completed anonymously by both parties if so desired.

The proposed method consists of the following steps as seen in FIGS. 2, 3, and 4:
1. one party initiates the escrow transaction by providing payment to the system or uploading one or more electronic files.
2. the second party reviews partial information about the files(s) uploaded by the first party or receives payment confirmation from the system
3. the second party accepts the escrow transaction by uploading one or more file(s) to the system or providing payment to the system.
4. the first party reviews partial information about the files(s) uploaded by the second party or receives payment confirmation from the system.
5. the first party confirms that the transaction is acceptable.
6. both parties are granted access to the files(s) or payment they are supposed to receive.
7. if so desired, the system can automatically remove the file(s) or otherwise restrict access to both parties after a specified period of time.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. A method for exchange and verification of one or more electronic files via an escrow transaction comprising:
   uploading of an original first electronic file by a first user to a centralized server via a first user interface to a computer network;
   altering of the original first electronic file located on the centralized server via a verification program that scrambles data in the original first electronic file, wherein a second user is only permitted to access parts of an altered first electronic file via a second user interface to the computer network to verify the authenticity of the original first electronic file, the verification program being associated with the centralized server;
   notifying the second user via the second user interface to the computer network of the uploading of the original first electronic file to the centralized server;
   reviewing selected information about the altered first electronic file by the second user via the second user interface to the computer network;
   approving the altered first electronic file by the second user via the second user interface to the computer network;
   uploading of an original second electronic file by the second user to the centralized server via the second user interface to the computer network;
   altering the second electronic file via the verification program on the centralized server, wherein the first user is only permitted to access parts of an altered second electronic file via the first user interface to the computer network to verify the authenticity of the original second electronic file;
   notifying the first user via the first user interface to the computer network of the uploading of the original second electronic file to the centralized server by the second user;
   reviewing selected information about the altered second electronic file by the first user via the first user interface to the computer network;
   approving of the altered second electronic file by the first user via the first user interface to the computer network;
   confirming of the escrow transaction by the first user via the first user interface to the computer network in order to permit access to the original first electronic file located on the centralized server by the second user and the original second electronic file located on the centralized server between the first user and the second user;
   notifying the second user via the second user interface to the computer network of the confirmation of the escrow transaction by the first user;
   accessing the original first electronic file on the centralized server by the second user via the second user interface to the computer network;
   accessing the original second electronic file on the centralized server by the first user via the first user interface to the computer network; and
   viewing of the second electronic file by the first user via the first user interface to the computer network and the first electronic file by the second user via the second user interface to the computer network.

2. The method of claim 1 wherein the first electronic file and the second electronic file are one of images, documents, audio, or a combination thereof.

3. The method of claim 1 wherein reviewing the selected information about the first electronic file via the second user interface to the computer network results in rejection of the first electronic file and notification to the second user of the rejection of the escrow transaction via the second user interface to the computer network.

4. The method of claim 1 further comprising removing the first electronic file and the second electronic file from the centralized server.

5. The method of claim 1 wherein reviewing the selected information about the second electronic file via the first user interface to the computer network results in rejection of the second electronic file and notification to the first user of the rejection of the escrow transaction via the first user interface to the computer network.

\* \* \* \* \*